United States Patent
Togawa et al.

(10) Patent No.: US 11,073,196 B2
(45) Date of Patent: Jul. 27, 2021

(54) ROTATION TRANSMITTING DEVICE

(71) Applicant: Sony Interactive Entertainment Inc., Tokyo (JP)

(72) Inventors: Keiji Togawa, Tokyo (JP); Morio Usami, Tokyo (JP); Hiroshi Osawa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 346 days.

(21) Appl. No.: 16/088,592

(22) PCT Filed: Apr. 10, 2017

(86) PCT No.: PCT/JP2017/014646
§ 371 (c)(1),
(2) Date: Sep. 26, 2018

(87) PCT Pub. No.: WO2017/179527
PCT Pub. Date: Oct. 19, 2017

(65) Prior Publication Data
US 2019/0107181 A1   Apr. 11, 2019

(30) Foreign Application Priority Data
Apr. 14, 2016   (JP) .............................. JP2016-081558

(51) Int. Cl.
*F16H 13/04*   (2006.01)
*B25J 17/00*   (2006.01)
(Continued)

(52) U.S. Cl.
CPC ............ *F16H 13/04* (2013.01); *B25J 9/0009* (2013.01); *B25J 17/00* (2013.01); *F16H 15/06* (2013.01)

(58) Field of Classification Search
CPC .. G03G 15/1615; G03G 15/757; F16H 13/04; F16H 15/06; B25J 9/0009; B25J 17/00
See application file for complete search history.

(56) References Cited

U.S. PATENT DOCUMENTS 3,043,149 A    7/1962   Davin
3,800,606 A *  4/1974   Schott ................. F16H 57/04
                                                        476/8

(Continued)

FOREIGN PATENT DOCUMENTS

CN    102725561 A    10/2012
CN    103498894 A    1/2014

(Continued)

OTHER PUBLICATIONS

Notification of Reason for Refusal for corresponding JP Application No. 2018-511998, 9 pages, dated Dec. 10, 2019.

(Continued)

*Primary Examiner* — Hoang X Ngo
(74) *Attorney, Agent, or Firm* — Matthew B. Dernier, Esq.

(57) ABSTRACT

Disclosed herein is a rotation transmitting device which permits the transmission of rotation with a reduced play and which permits the constituents to be aligned easily. The rotation transmitting device has a transmitting member (30) which surrounds a rotating part (12) of a drive shaft (11) and a rotating part (22) of a driven shaft (21). At least either the rotating part (12) of the drive shaft (11) or the rotating part (22) of the driven shaft (21) has an external surface that comes into contact with the internal surface of the transmitting member (30) so that friction arising between the internal surface and the external surface achieves torque transmission and reception to and from the transmitting member (30).

8 Claims, 11 Drawing Sheets

(51) Int. Cl.
  F16H 15/06   (2006.01)
  B25J 9/00    (2006.01)

(56) References Cited

U.S. PATENT DOCUMENTS

| | | |
|---|---|---|
| 8,827,864 B2 | 9/2014 | Durack |
| 2012/0202644 A1 | 8/2012 | Durack |
| 2014/0287868 A1 | 9/2014 | Meyer |

FOREIGN PATENT DOCUMENTS

| | | |
|---|---|---|
| FR | 857238 A | 8/1940 |
| JP | 59190558 A | 10/1984 |
| JP | 200211679 A | 1/2002 |
| JP | 2004144122 A | 5/2004 |

OTHER PUBLICATIONS

International Preliminary Report on Patentability and Written Opinion for corresponding PCT Application No. PCT/JP2017/014646, 12 pages, dated Oct. 18, 2018.
International Search Report for corresponding PCT Application No. PCT/JP2017/014646, 2 pages, dated Jun. 13, 2017.
Extended European Search Report for corresponding EP Application No. 17782340.8, 7 pages, dated Oct. 29, 2019.
English Translation of First Office Action for corresponding CN Application No. 201780022364.1, 18 pages, dated Nov. 2, 2020.
Notification of Reason for Refusal for corresponding CN Application No. 201780022364.1, 7 pages, dated Nov. 2, 2020.

* cited by examiner

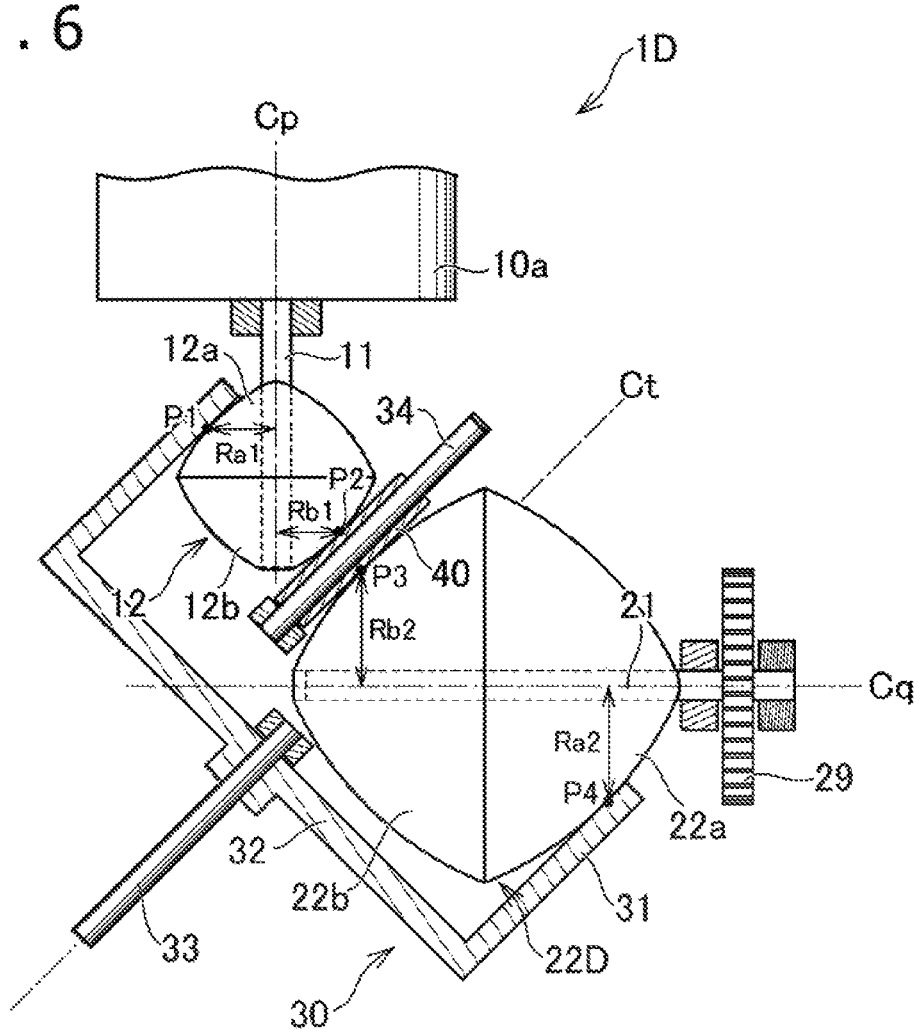

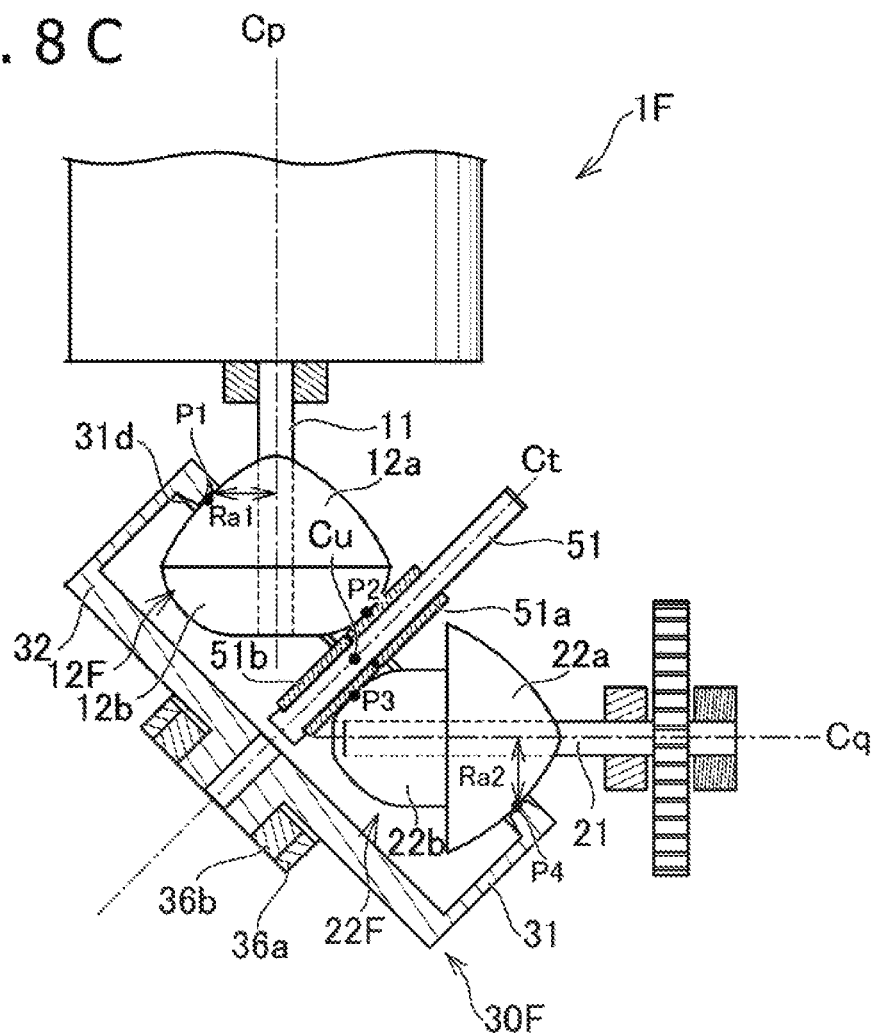

ROTATION TRANSMITTING DEVICE

TECHNICAL FIELD

The present invention relates to a rotation transmitting device to transmit rotary force received from a power source such as electric motor.

BACKGROUND ART

There have been developed various robots imitating animals and human beings (as disclosed in Japanese Patent Laid-Open No. 2002-11679, for example). Such robots sometimes have a pair of arms linked together, one being provided with a motor inside and the other being provided with a driven shaft. The driven shaft rotates as it receives torque from the motor so as to move together with the other arm. The existing robots usually rely on gears for rotation (torque) transmission from the motor's rotating shaft to the driven shaft. For example, the motor's rotating shaft and the driven shaft which are arranged at right angles to each other are linked together through bevel gears.

SUMMARY

The foregoing structure that employs bevel gears for rotation transmission from the motor's shaft to the driven shaft is liable to cause play in the movement of the actuator. It also has difficulty in aligning the motor's rotation shaft and the driven shaft to each other with great accuracy on account of their dimensional tolerance. This is true particularly in the case where the arm has a built-in actuator composed of small motors and gears.

According to the first embodiment of the present invention, a rotation transmitting device includes a first rotating shaft and a second rotating shaft, with the former having a first rotating part and the latter having a second rotating part such that the first rotating shaft and the second rotating shaft intersect with each other, and the first rotating part and the second rotating part being surrounded by a transmitting member. The first rotating part transmits rotation to the transmitting member, which in turn transmits rotation to the second rotating part. The transmission of rotation from the rotating part of at least one of the first rotating part and the second rotating part to the transmitting member is accomplished by means of friction between an external surface of the at least one of the rotating part and an internal surface of the transmitting member.

The rotation transmitting device mentioned above is able to reduce play encountered in rotation transmission. Moreover, it permits the transmitting member to define the position of the rotating part, thereby facilitating their alignment.

BRIEF DESCRIPTION OF DRAWINGS

FIG. 6 is a sectional view depicting further another example of the rotation transmitting device according to one embodiment of the present invention.

FIG. 8C is a sectional view depicting the important parts of the rotation transmitting device depicted in FIG. 8A.

DESCRIPTION OF EMBODIMENTS

The following is a description of the embodiments according to the present invention. The embodiments depicted in this specification are mere examples, which are not intended to restrict the scope of the invention. The scope of the invention covers any other embodiments which have advantages identical or similar to those disclosed herein.

Figure 1A:
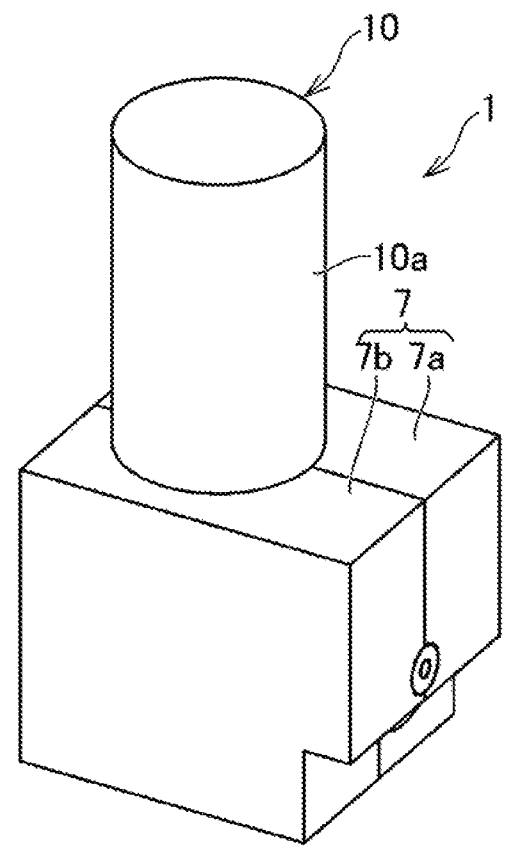
FIG. 1A is a perspective view of the rotation transmitting device according to one embodiment of the present invention.
Figure 1B:
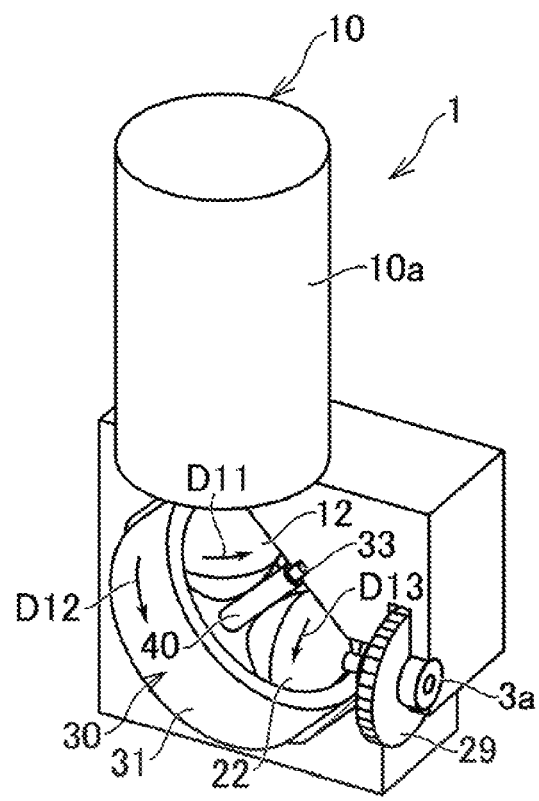
FIG. 1B is a perspective view depicting the inside of the casing of the rotation transmitting device depicted in FIG. 1A.
Figure 1C:
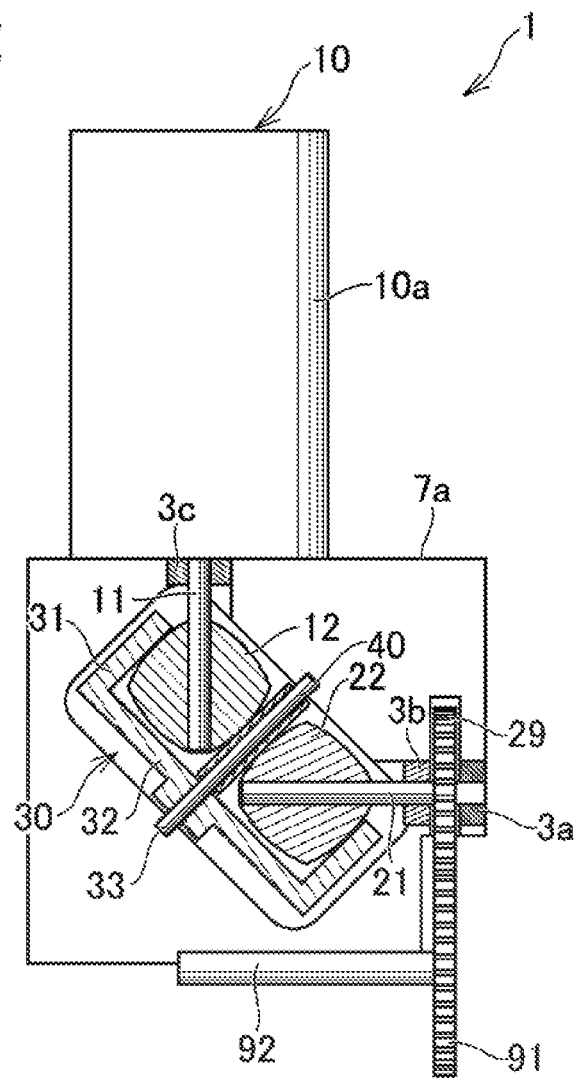
FIG. 1C is a sectional view depicting the rotation transmitting device depicted in FIG. 1A.
Figure 2:
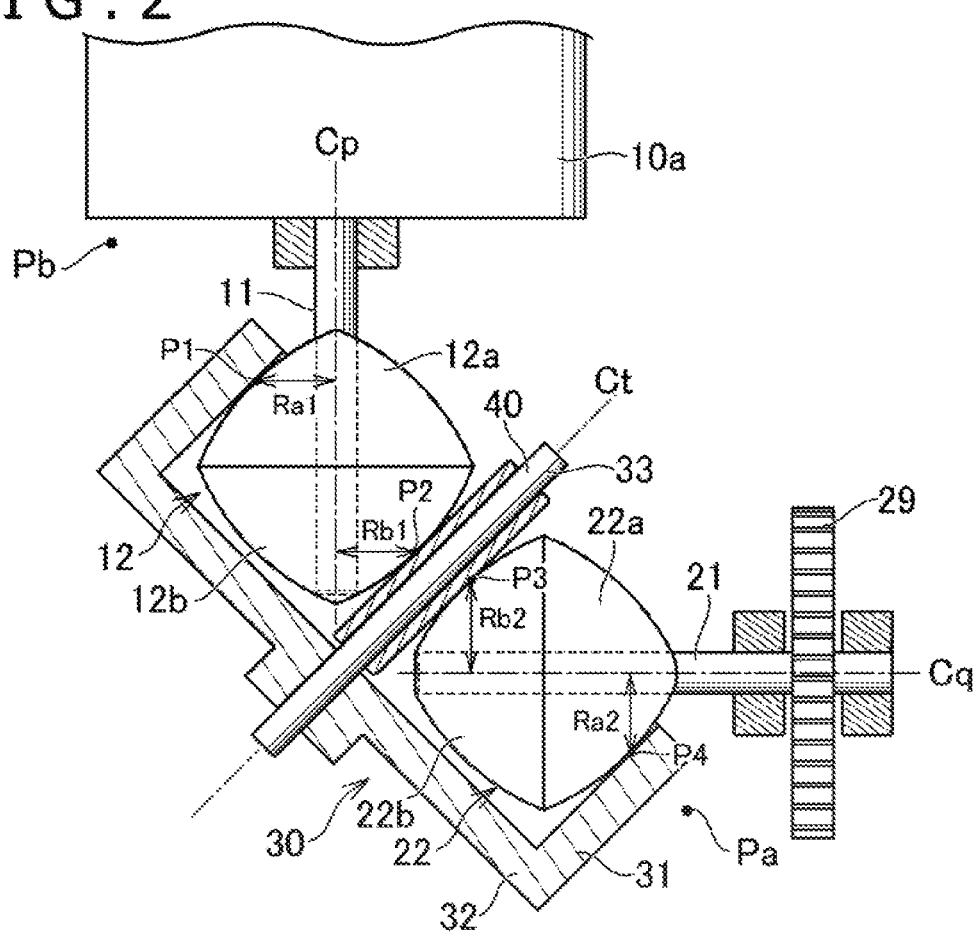
FIG. 2 is an enlarged sectional view depicting the important parts of the rotation transmitting device depicted in FIG. 1A.

FIGS. 1A to 1C illustrate a rotation transmitting device 1 according to one embodiment of the present invention. FIG. 1A is a perspective view depicting the whole body of the rotation transmitting device 1. FIG. 1B is a perspective view depicting the inside of a casing 7 of the rotation transmitting device 1. FIG. 1C is a sectional view depicting rotating parts 12 and 22 and a transmitting member 30, which will be mentioned later. FIG. 2 is an enlarged sectional view depicting the important parts of the rotation transmitting device depicted in FIG. 1A.

As depicted in FIG. 1C, the rotation transmitting device 1 includes an electric motor 10 (as a power source) and a driven shaft 21, which rotates as it receives torque from the electric motor 10. In the case of the illustrated rotation transmitting device 1, the electric motor 10 includes a motor proper 10a and a drive shaft 11 extending from the motor proper 10a. The motor proper 10a contains therein a rotor and a stator so that it rotates the drive shaft 11. It is not always necessary for the drive shaft 11 to extend from the motor proper 10a. For example, the drive shaft 11 may be replaced by any reduction mechanism that transmits the rotation (torque) of the motor proper 10a. The drive shaft 11 corresponds to "the first rotating shaft" in the claims and the driven shaft 21 corresponds to "the second rotating shaft" in the claims.

The rotation of the drive shaft 11 is transmitted to the driven shaft 21 through the transmitting member 30. Consequently, the rotation transmitting device 1 functions as an actuator to move any member (such as arm) connected to the driven shaft 21. The driven shaft 21 has a gear 29 attached to the end thereof so that it rotates together with the driven shaft 21, as depicted in FIG. 1C. In the case where the rotation transmitting device 1 is used for a robot (for example), the gear 29 may be engaged with an additional gear 91 as depicted in FIG. 1C, and the gear 91 is attached to a shaft 92 of the arm (for example). The gear 29 attached to the driven shaft 21 may be replaced by an arm for the link mechanism or any other member that outputs the rotation of the driven shaft 21. The drive shaft 11 may have a bearing 3c arranged at the base thereof, and the driven shaft 21 may have bearings 3b and 3a.

The drive shaft 11 and the driven shaft 21 are arranged such that they intersect with each other. That is, they intersect with each other at right angles in the case of the rotation transmitting device 1. The angle of intersection is not always a right angle; it may be 70 degrees or 80 degrees, for example. An adequate angle should be selected according to the direction of the member to be moved by the driven shaft 21.

The drive shaft 11 carries the rotating part 12 attached thereto which rotates together with the drive shaft 11. The drive shaft 11 and the rotating part 12 may be formed integrally or assembled from separately formed parts. The driven shaft 21 carries the rotating part 22 attached thereto which rotates together with the driven shaft 21. The driven shaft 21 and the rotating part 22 may be formed integrally or assembled from separately formed parts. In what follows, the rotating part 12 of the drive shaft 11 will be referred to as the drive rotating part 12, and the rotating part of the driven shaft 21 will be referred to as the driven rotating part 22.

The rotation transmitting device 1 has the transmitting member 30, and the transmitting member 30 has a ring unit 31 as depicted in FIG. 1B. The drive rotating part 12 and the driven rotating part 22 are arranged inside the ring unit 31 so that they are surrounded by the ring unit 31. The internal surface of the ring unit 31 has the part in contact with the external surface of the drive rotating part 12 and the part in contact with the external surface of the driven rotating part 22.

The drive rotating part 12 and the ring unit 31 are arranged such that friction arises between their respective outside and inside. In other words, friction arises between them because they are in contact with each other under pressure. The drive rotating part 12 transmits rotation (torque) to the transmitting member 30 through friction between the outside of the drive rotating part 12 and inside of the ring unit 31. There is no meshing part (such as gear) between the outside of the drive rotating part 12 and the inside of the ring unit 31.

By the same token, there is no meshing part between the inside of the ring unit 31 and the outside of the driven rotating part 22. The driven rotating part 22 and the ring unit 31 are arranged such that friction arises between their respective outside and inside. In other words, friction arises between them because they are in contact with each other under pressure. The transmitting member 30 transmits rotation (torque) to the driven rotating part 22 through friction between the outside of the driven rotating part 22 and the inside of the ring unit 31. Being rotatably supported, the transmitting member 30 rotates together with the rotating parts 12 and 22.

The transmitting member 30 constructed as mentioned above permits the drive shaft 11 to transit rotation (torque) to the driven shaft 21. As illustrated in FIG. 1B, the torque transmission takes place in the following sequence. The drive shaft 11 and the drive rotating part 12 rotate in a direction D11 and the transmitting member 30 rotates in a direction D12. As the result, the driven shaft 21 and the driven rotating part 22 rotate in a direction D13. Since the drive rotating parts 12 and the driven rotating part 22 can be positioned definitely by the transmitting member 30, it is easy to position the two rotating parts 12 and 22. The transmitting member 30, particularly the ring unit 31, should preferably be formed integrally. This permits the rotating parts 12 and 22 to be aligned accurately. The transmitting member 30 may also be constructed from a plurality of parts. The transmitting member 30, the drive rotating part 12, and the driven rotating part 22 may be formed from such materials as metals and plastics.

Incidentally, it is not always necessary that the internal surface of the ring unit 31 is in contact under pressure with the external surface of the drive rotating part 12. In other words, it is not always necessary that the internal surface of the ring unit 31 and the external surface of the drive rotating part 12 are in direct contact with each other. For example, the ring unit 31 and the drive rotating part 12 may be arranged such that there exists oil film between their respective internal and external surfaces and this oil film brings about friction between them due to its viscous properties. That is, the transmission of rotation from the drive rotating part 12 to the transmitting member 30 may be achieved by means of traction (or viscous friction). Likewise, the driven rotating part 22 and the ring unit 31 may be arranged such that there exists oil film between their respective external and internal surfaces and the driven rotating part 22 and the ring unit 31 come into contact with each other, with this oil film interposed between them. In other words, the transmission of rotation from the driven rotating part 22 to the transmitting member 30 may be achieved by means of traction.

The rotation transmitting device 1 illustrated in FIG. 1C has the transmitting member 30 which takes on a cuplike shape. In other words, the transmitting member 30 has a bottom 32 which is formed on the edge of the ring unit 31. The transmitting member 30 is supported by the supporting shaft 33 attached to the center of the bottom 32, so that it is rotatable around the supporting shaft 33. The rotation transmitting device 1 also has the casing 7 holding the transmitting member 30 and the rotating parts 12 and 22, as depicted in FIG. 1A. The supporting shaft 33 is supported inside the casing 7. For example, the supporting shaft 33 has its ends fitted into the holes formed inside the chamber holding the transmitting member 30. The rotation transmitting device 1 exemplified herein has the supporting shaft 33 which is rotatable integrally with the transmitting member 30. It is possible that the supporting shaft 33 is fixed to the casing 7 and the transmitting member 30 is rotatable relative to the supporting shaft 33.

The transmitting member 30 is capable of rotation around a rotation center line Ct as depicted in FIG. 2. The rotation center line Ct is a hypothetical straight line passing through the center of rotation of the transmitting member 30. The transmitting member 30 is arranged such that the rotation center line Ct thereof is aslant to both the drive shaft 11 and the driven shaft 21. In addition, the transmitting member 30 is arranged such that the rotation center line Ct thereof lies on the plane containing an axis line Cp of the drive shaft 11 and an axis line Cq of the driven shaft 21, as depicted in FIG. 2. In the case of the rotation transmitting device 1 mentioned above, the rotation center line Ct bisects the angle between the drive shaft 11 and the driven shaft 21. In the case of the rotation transmitting device 1 mentioned above, the drive shaft 11 and the driven shaft 21 are perpendicular to each other. Therefore, the angle between the rotation center line Ct and the drive shaft 11 and the angle between the rotation center line Ct and the driven shaft 21 are both 45 degrees.

The transmitting member 30 may have any other layout and construction than those mentioned above. For example, it is not always necessary for the rotation center line Ct to bisect the angle between the drive shaft 11 and the driven shaft 21. This permits the drive shaft 11 and the driven shaft 21 to vary in reduction ratio (to be mentioned later). Moreover, the rotation center line Ct may be displaced from the plane containing both the axis line Cp of the drive shaft 11 and the axis line Cq of the driven shaft 21.

Furthermore, it is not always necessary for the transmitting member 30 to have the bottom 32 and to be supported by the supporting shaft 33. In this case, the transmitting member 30 may be provided with a bearing that supports it outside the ring unit 31.

The transmitting member 30 may be mounted such that it rotates through less than 360 degrees (namely, 30 degrees or 60 degrees) around the rotation center line Ct. It is not always necessary for the transmitting member 30 to be round in shape. That is, the transmitting member 30 may have an external surface which is partly curved and partly flat. The curved surface is parallel to a circular arc which encloses the rotation center line Ct as its center and which covers the area in contact with the external surface of the drive rotating part 12 inside the ring unit 31 and also covers the area in contact with the external surface of the driven rotating part 22 inside the ring unit 31. To be more precise, the internal surface of the ring unit 31 may have a curved surface parallel to a circular arc which encloses the rotation center line Ct as its center and which covers the area corresponding to the range of the rotation angle of the transmitting member 30.

In addition, it is not always necessary for the transmitting member 30 to have the ring unit 31. For example, the transmitting member 30 may have a first opening whose internal surface is in contact with the external surface of the drive rotating part 12 and also have a second opening whose internal surface is in contact with the external surface of the driven rotating part 22.

As depicted in FIG. 2, the rotation transmitting device 1 has an intermediate transmitting member 40 which is arranged between the drive rotating part 12 and the driven rotating part 22. In the illustrated case, the intermediate transmitting member 40 is cylindrical in shape and holds the supporting shaft 33 arranged therein so that it is rotatably supported by the supporting shaft 33. The intermediate transmitting member 40 has its external surface in contact with the drive rotating part 12 and the driven rotating part 22. The intermediate transmitting member 40 has its rotation center line on the hypothetical plane containing the axis line Cp of the drive shaft 11 and the axis line Cq of the driven shaft 21.

The drive rotating part 12 and the intermediate transmitting member 40 are arranged such that friction arises between their external surfaces. For example, the intermediate transmitting member 40 has its external surface pressed against the external surface of the drive rotating part 12. The drive rotating part 12 transmits rotation (torque) to the intermediate transmitting member 40 through friction that arises between the respective external surfaces of the drive rotating part 12 and the intermediate transmitting member 40. There exists no meshing part (such as gear) formed between the respective external surfaces of the drive rotating part 12 and the intermediate transmitting member 40.

The driven rotating part 22 and the intermediate transmitting member 40 are also arranged in such a way that friction arises between the respective external surfaces of the driven rotating part 22 and the intermediate transmitting member 40. For example, the intermediate transmitting member 40 has its external surface pressed against the external surface of the driven rotating part 22. The driven rotating part 22 receives rotation (torque) from the intermediate transmitting member 40 through friction that arises between the respective external surfaces of the driven rotating part 22 and the intermediate transmitting member 40. There exists no meshing part (such as gear) formed between the respective external surfaces of the intermediate transmitting member 40 and the driven rotating part 22.

The intermediate transmitting member 40 mentioned above permits the respective positions of the drive rotating part 12 and the driven rotating part 22 to be defined by the intermediate transmitting member 40 and the transmitting member 30. In addition, it also permits the drive shaft 11 to transmit its rotation to the driven shaft 21 through not only the transmitting member 30 but also the intermediate transmitting member 40.

Incidentally, it is not always necessary for the intermediate transmitting member 40 to have its external surface pressed against the external surface of the drive rotating part 12. In other words, it is not always necessary that the respective external surfaces of the intermediate transmitting member 40 and the drive rotating part 12 are in direct contact with each other. For example, the intermediate transmitting member 40 and the drive rotating part 12 may be arranged such that oil film is formed between their respective external surfaces, which come into contact with each other through this oil film. The oil film makes its viscosity to produce friction between the intermediate transmitting member 40 and the drive rotating part 12. This viscosity functions as viscous friction (traction) that transmits rotation between the intermediate transmitting member 40 and the drive rotating part 12. Likewise, it is not always necessary for the intermediate transmitting member 40 to have its external surface pressed against the external surface of the driven rotating part 22. In other words, it is not always necessary that the respective external surfaces of the intermediate transmitting member 40 and the driven rotating part 22 are in direct contact with each other. For example, the intermediate transmitting member 40 and the driven rotating part 22 may be arranged such that oil film is formed between their respective external surfaces, which come into contact with each other through this oil film. The oil film makes its viscosity to produce friction between the intermediate transmitting member 40 and the driven rotating part 22. This viscosity functions as viscous friction (traction) that transmits rotation between the intermediate transmitting member 40 and the driven rotating part 22.

As depicted in FIG. 2, the drive rotating part 12 includes an outside-contact rotating part 12a and an inside-contact rotating part 12b, with the former having an external surface in contact with the internal surface of the ring unit 31 and the latter having an external surface in contact with the external surface of the intermediate transmitting member 40.

As depicted in FIG. 2, the outside-contact rotating part 12a has a shape which is rotationally symmetrical with respect to the axis line of the drive shaft 11. In addition, the outside-contact rotating part 12a, which is rotationally symmetrical with respect to the drive shaft 11, varies in radius along the axial direction of the drive shaft 11. To be concrete, the outside-contact rotating part 12a, which turns around the drive shaft 11, gradually increases in radius in going toward the fore-end of the drive shaft 11. The outside-contact rotating part 12a shaped in this manner is characterized in that its external surface which, at a contact point P1 where the outside-contact rotating part 12a meets the transmitting member 30, meets the internal surface of the ring unit 31 in the radial direction (intersecting the central line Ct at right angles) of the rotation center line Ct around which the transmitting member 30 rotates. According to one example, the outside-contact rotating part 12a takes on an approximately conical shape surrounding the drive shaft 11. The outside-contact rotating part 12a may have an external surface which bulges out in the radial direction of the drive shaft 11. For example, the outside-contact rotating part 12a may take on a semispherical shape.

As depicted in FIG. 2, the inside-contact rotating part 12b has a shape which is rotationally symmetrical with respect to the axis line of the drive shaft 11. In addition, the inside-contact rotating part 12b, which turns around the drive shaft 11, varies in radius along the axial direction of the drive shaft 11. To be concrete, contrary to the outside-contact rotating part 12a, the inside-contact rotating part 12b, which turns around the drive shaft 11, gradually decreases in radius in going toward the fore-end of the drive shaft 11. The inside-contact rotating part 12b shaped in this manner is characterized in that its external surface which, at a contact point P2 where the inside-contact rotating part 12b meets the intermediate transmitting member 40, meets the external surface of the intermediate transmitting member 40 in the radial direction (intersecting the central line Ct at right angles) of the rotation center line Ct around which the inside-contact rotating part 12b rotates. According to one example, the inside-contact rotating part 12b takes on an approximately conical shape surrounding the drive shaft 11. The inside-contact rotating part 12b may have an external surface which bulges out in the radial direction of the drive shaft 11. For example, the inside-contact rotating part 12b may take on a semispherical shape.

The outside-contact rotating part 12a, which rotates around the drive shaft 11, has its radius gradually increasing in going toward the fore-end of the drive shaft 11. On the other hand, contrary to the outside-contact rotating part 12a, the inside-contact rotating part 12b, which rotates around the drive shaft 11, has its radius gradually decreasing in going toward the fore-end of the drive shaft 11. Moreover, the outside-contact rotating part 12a and the inside-contact rotating part 12b come into contact with each other in the axial direction of the drive shaft 11. Thus, the drive rotating part 12 as a whole has a rhombic cross section passing through the drive shaft 11. Alternatively, the drive rotating part 12 may take on a spherical shape.

Either the external surface of the outside-contact rotating part 12a or the internal surface of the ring unit 31 may be curved such that its contact area decreases. This is achieved in the case of the rotation transmitting device 1 because the external surface of the outside-contact rotating part 12a is curved so that the distance between the external surface of the outside-contact rotating part 12a and the rotation center line Ct of the transmitting member 30 is maximum at the contact point P1 between the outside-contact rotating part 12a and the transmitting member 30. This reduces the contact area between the ring unit 31 and the outside-contact rotating part 12a. This in turn suppresses resistance detrimental to the rotation of the drive shaft 11 and the transmitting member 30. In the case of the rotation transmitting device 1, the external surface of the outside-contact rotating part 12a is so curved as to bulge out toward the internal surface of the ring unit 31. To be concrete, the external surface of the outside-contact rotating part 12a describes an arc centered at a point Pa which is away from the inside of the ring unit 31 in the direction perpendicular to the rotation center line Ct (as depicted in FIG. 2). Incidentally, the above-mentioned example of the rotation transmitting device 1 may be modified such that the internal surface of the ring unit 31 is so curved as to bulge out toward the rotation center line Ct. In other words, the internal surface of the transmitting member 30 is curved such that the distance between the internal surface of the transmitting member 30 and the rotation center line Ct of the transmitting member 30 is minimal at the contact point P1.

Moreover, either the external surface of the inside-contact rotating part 12b or the external surface of the intermediate transmitting member 40 may be curved such that its contact area decreases. This is achieved in the case of the rotation transmitting device 1 because the external surface of the inside-contact rotating part 12b is curved so that the distance between the external surface of the inside-contact rotating part 12b and the rotation center line Ct is minimal at the contact point P2 between the external surface of the inside-contact rotating part 12b and the external surface of the intermediate transmitting member 40. This reduces the contact area between the intermediate transmitting member 40 and the inside-contact rotating part 12b. This in turn suppresses resistance detrimental to the rotation of the drive shaft 11 and the intermediate transmitting member 40. In the case of the rotation transmitting device 1, the external surface of the inside-contact rotating part 12b is so curved as to bulge out toward the intermediate transmitting member 40. To be concrete, the external surface of the inside-contact rotating part 12b describes an arc centered at a point Pb which is away from the intermediate transmitting member 40 in the direction perpendicular to the rotation center line Ct. Incidentally, the above-mentioned example of the rotation transmitting device 1 may be modified such that the external surface of the intermediate transmitting member 40 is so curved as to bulge out in the radial direction of the rotation center line Ct. In other words, the external surface of the intermediate transmitting member 40 is curved such that the distance between the external surface of the intermediate transmitting member 40 and the rotation center line Ct is maximum at the contact point P2.

As in the case of the drive rotating part 12, the driven rotating part 22 includes an outside-contact rotating part 22a and an inside-contact rotating part 22b, with the former having an external surface in contact with the internal surface of the ring unit 31 and the latter having an external surface in contact with the external surface of the intermediate transmitting member 40.

In the case of the rotation transmitting device 1, the outside-contact rotating part 22a of the driven rotating part 22 is identical in shape with the outside-contact rotating part 12a of the drive rotating part 12. In other words, the outside-contact rotating part 22a takes on a shape which is rotationally symmetrical with respect to the axis line of the driven shaft 21. In addition, the outside-contact rotating part 22a that turns around the driven shaft 21 varies in radius in going in the axial direction of the driven shaft 21. To be concrete, the outside-contact rotating part 22a, which turns around the driven shaft 21, gradually increases in radius in going toward the fore-end of the driven shaft 21. The outside-contact rotating part 22a shaped in this manner is characterized in that its external surface which, at a contact point P4 where the outside-contact rotating part 22a meets the transmitting member 30, meets the internal surface of the ring unit 31 in the radial direction (intersecting the central line Ct at right angles) of the rotation center line Ct around which the transmitting member 30 rotates. According to one example, the outside-contact rotating part 22a takes on an approximately conical shape surrounding the driven shaft 21. The outside-contact rotating part 22a may take on a semispherical shape.

Either the external surface of the outside-contact rotating part 22a or the internal surface of the ring unit 31 may be curved such that its contact area decreases. This is achieved in the case of the rotation transmitting device 1 because the external surface of the outside-contact rotating part 22a is curved so that the distance between the external surface of the outside-contact rotating part 22a and the rotation center line Ct of the transmitting member 30 is maximum at the contact point P4 between the outside-contact rotating part 22a and the transmitting member 30. This reduces the contact area between the ring unit 31 and the outside-contact rotating part 22a. This in turn suppresses resistance detrimental to the rotation of the driven shaft 21 and the transmitting member 30. The rotation transmitting device 1 illustrated above may be replaced by the one in which the internal surface of the ring unit 31 is so curved as to bulge out toward the rotation center line Ct. In other words, the internal surface of the transmitting member 30 is curved such that the distance between the internal surface of the transmitting member 30 and the rotation center line Ct of the transmitting member 30 is minimal at the contact point P4.

In the case of the rotation transmitting device 1, the inside-contact rotating part 22b of the driven rotating part 22 is identical in shape with the inside-contact rotating part 12b of the drive rotating part 12. In other words, the inside-contact rotating part 22b takes on a shape which is rotationally symmetrical with respect to the axis line of the driven shaft 21. In addition, the inside-contact rotating part 22b that turns around the driven shaft 21 varies in radius in going in the axial direction of the driven shaft 21. To be concrete, contrary to the outside-contact rotating part 22a, the inside-contact rotating part 22b, which turns around the driven shaft 21, gradually increases in radius in going toward the fore-end of the driven shaft 21. The inside-contact rotating part 22b shaped in this manner is characterized in that its external surface which, at a contact point P3 where the inside-contact rotating part 22b meets the intermediate transmitting member 40, meets the external surface of the intermediate transmitting member 40 in the radial direction (intersecting the central line Ct at right angles) of the rotation center line Ct around which the intermediate transmitting member 40 rotates. According to one example, the inside-contact rotating part 22b takes on an approximately conical shape surrounding the driven shaft 21. The inside-contact rotating part 22b may have the external surface which so curves as to bulge out toward the radial direction of the driven shaft 21. For example, the inside-contact rotating part 22b may take on a semispherical shape.

Either the external surface of the inside-contact rotating part 22b or the external surface of the intermediate transmitting member 40 may be curved such that its contact area decreases. This is achieved in the case of the rotation transmitting device 1 because the external surface of the inside-contact rotating part 22b is curved so that the distance between the external surface of the inside-contact rotating part 22b and the rotation center line Ct is maximum at the contact point P3 between the external surface of the inside-contact rotating part 22b and the external surface of the intermediate transmitting member 40. This reduces the contact area between the intermediate transmitting member 40 and the inside-contact rotating part 22b. This in turn suppresses resistance detrimental to the rotation of the driven shaft 21 and the intermediate transmitting member 40. The rotation transmitting device 1 illustrated above may be replaced by the one in which the external surface of the intermediate transmitting member 40 is so curved as to bulge out in the radial direction of the rotation center line Ct. In other words, the external surface of the intermediate transmitting member 40 is curved such that the distance between the external surface of the intermediate transmitting member 40 and the rotation center line Ct is maximum at the contact point P3. The rotation transmitting device 1 may be replaced by one in which the drive rotating part 12 is not identical in shape with the driven rotating part 22.

The drive shaft 11 transmits its rotation to the driven shaft 21 through the transmitting member 30. There is a relationship expressed by the following formula between a rotational speed $\omega a$ of the drive shaft 11 and a rotational speed $\omega b$ of the driven shaft 21:

$$\omega b = \omega a \times Ra1/Ra2$$

where, Ra1 denotes the distance between the rotation center of the drive shaft 11 and the contact point P1 where the external surface of the drive rotating part 12 meets internal surface of the ring unit 31, and Ra2 denotes the distance between the rotation center of the driven shaft 21 and the contact point P4 where the external surface of the driven rotating part 22 meets the internal surface of the ring unit 31. In the case of the rotation transmitting device 1, the rotation of the drive shaft 11 is transmitted to the driven shaft 21 through the intermediate transmitting member 40. By the same token as mentioned above, there is a relationship expressed by the following formula between the rotational speed $\omega a$ of the drive shaft 11 and the rotational speed $\omega b$ of the driven shaft 21:

$$\omega b = \omega a \times Rb1/Rb2$$

where, Rb1 denotes the distance between the rotation center of the drive shaft 11 and the contact point P2 where the external surface of the drive rotating part 12 meets the external surface of the intermediate transmitting member 40, and Rb2 denotes the distance between the rotation center of the driven shaft 21 and the contact point P3 where the external surface of the driven rotating part 22 meets the external surface of the intermediate transmitting member 40. There should be a correspondence between the speed of the rotation to be transmitted to the driven shaft 21 through the transmitting member 30 and the speed of the rotation to be transmitted to the driven shaft 21 through the intermediate transmitting member 40. Consequently, the distance is defined as follows.

$$Ra1:Rb1 = Ra2:Rb2$$

Also, the reduction ratio ($\omega b/\omega a$) attained by the rotation transmitting device 1 is defined by the following formula.

$$\omega b/\omega a = Ra1/Ra2 = Rb1/Rb2$$

The rotation transmitting device 1 mentioned above should preferably have the contact points P1, P2, P3, and P4 which are linearly aligned. This prevents the occurrence of moment because of mutual cancellation of unnecessary internal forces acting at each contact point, thereby stabilizing the positions of the rotating parts 12 and 22 and the transmitting member 30.

Figure 3:
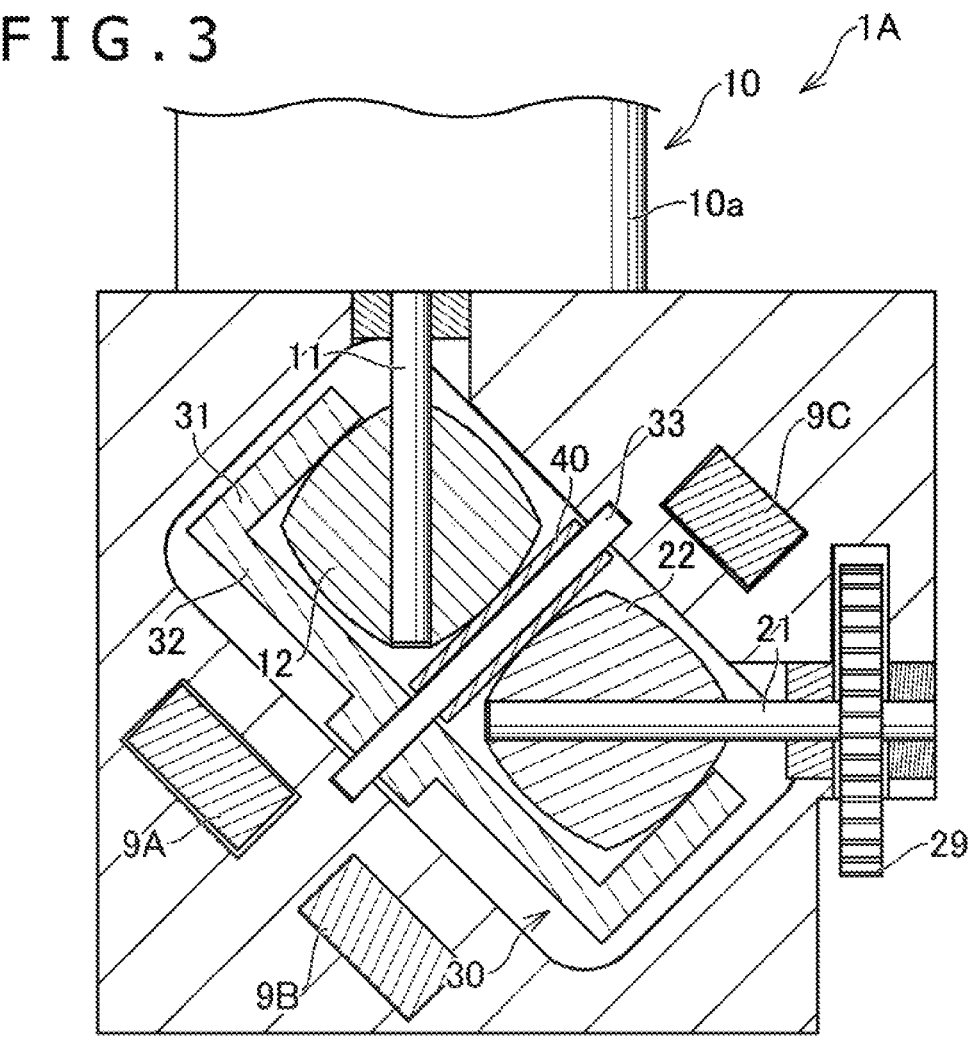
FIG. 3 is a diagram depicting a modified example of the rotation transmitting device according to one embodiment of the present invention.

The rotation transmitting device 1 mentioned above may be modified to give a rotation transmitting device 1A as depicted in FIG. 3, which is a sectional view. The original and modified devices employ the identical symbols to denote the identical parts, and the differences between them are mainly explained in the following, with description omitted for the identical parts throughout the two devices.

The rotation transmitting device 1A is provided with a heating element 9A and a cooling element 9B, which are intended to heat and cool all or part of the transmitting member 30, the rotating parts 12 and 22, and the intermediate transmitting member 40. The heating and cooling elements 9A and 9B may be Peltier modules. In this case, the transmitting member 30, the rotating parts 12 and 22, and the intermediate transmitting member 40 may be formed from materials differing from one another in the coefficient of expansion. Materials with a low coefficient of expansion include, for example, ferrous metals, and materials with a high coefficient of expansion include, for example, aluminum alloys such as duralumin. In the case of the rotation transmitting device 1A, the heating element 9A and the cooling element 9B are held in the casing 7.

The heating element 9A and the cooling element 9B make it possible to adjust the maximum torque to be transmitted by the transmitting member 30. For example, in the case where torque transmission is achieved by friction that arises due to direct contact between the transmitting member 30 and the rotating parts 12 and 22, heating by the heating element 9A increases the contact pressure on the contact plane. By contrast, cooling by the cooling element 9B lowers the contact pressure on the contact plane, thereby decreasing the maximum torque to be transmitted. In addition, since the transmitting member 30 and the rotating parts 12 and 22 are in contact with each other through an oil film and torque transmission relies on the friction due to the viscosity of the oil film, heating reduces the gap (or the thickness of the oil film) between the transmitting member 30 and the rotating parts 12 and 22, thereby increasing the maximum torque to be transmitted. By contrast, cooling reduces the gap (or the thickness of the oil film) between the transmitting member 30 and the rotating parts 12 and 22, thereby reducing the maximum torque to be transmitted.

Moreover, the rotation transmitting device 1A should preferably have a temperature sensor 9C as depicted in FIG. 3. The temperature sensor 9C gives out signals that facilitate controlling the maximum torque to be transmitted. The rotation transmitting device 1A is provided with a control system to control the heating element 9A and the cooling element 9B by means of a table recording the relationship between the temperature and the maximum torque to be transmitted. Incidentally, it is not always necessary for the rotation transmitting device 1A to have the temperature sensor 9C.

While the rotation transmitting device 1A is in operation, it is not always necessary for the heating element 9A to heat all the transmitting member 30, the rotating parts 12 and 22, and the intermediate transmitting member 40. For example, the heating element 9A may be so arranged as to heat only the transmitting member 30 and the drive rotating part 12. In other words, it is only necessary to heat any one of the members for torque transmission. By the same token, it is not always necessary for the cooling element 9B to cool all the transmitting member 30, the rotating parts 12 and 22, and the intermediate transmitting member 40. For example, the cooling element 9B may be so arranged as to cool only the transmitting member 30 and the drive rotating part 12. In other words, it is only necessary to cool any one of the members for torque transmission.

Figure 4:
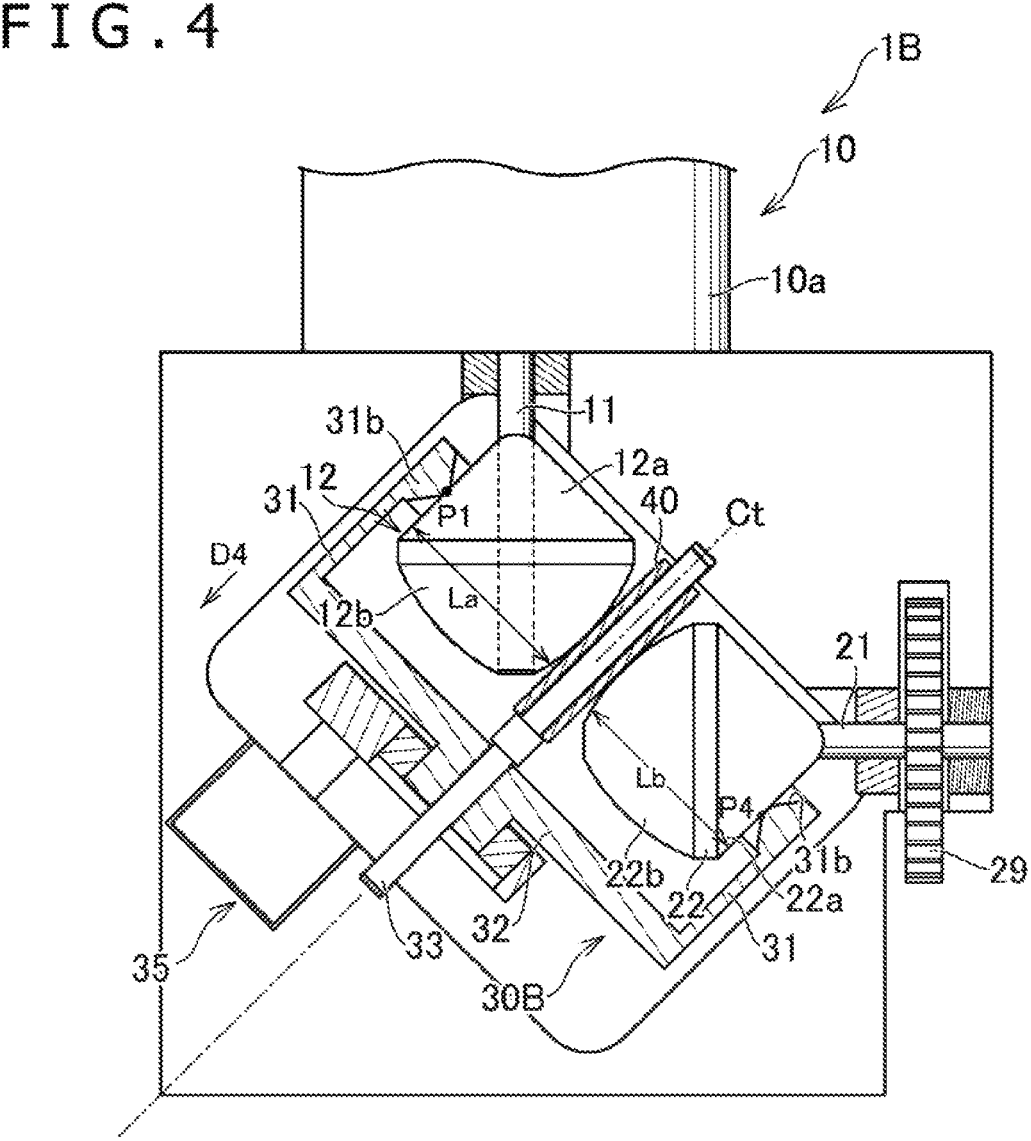
FIG. 4 is a diagram depicting a further modified example of the rotation transmitting device according to one embodiment of the present invention.

The rotation transmitting device 1 mentioned above may be further modified as depicted in FIG. 4, which is a sectional view of a rotation transmitting device 1B. The original and modified devices employ the identical symbols to denote the identical parts, and the differences between them are mainly explained in the following, with description omitted for the identical parts throughout the two devices.

The rotation transmitting device 1B is provided with a transmitting member 30B. The rotation transmitting device 1B is constructed such that the distance is variable between the rotation center of the drive shaft 11 and the contact point P1 at which the internal surface of the transmitting member 30B meets the external surface of the drive rotating part 12. It is also constructed such that the distance is variable between the rotation center of the driven shaft 21 and the contact point P4 at which the internal surface of the transmitting member 30B meets the external surface of the driven rotating part 22. In the case of the rotation transmitting device 1B, the transmitting member 30B is movable along its rotation center line Ct. The above-mentioned distance can be varied as the transmitting member 30B moves. For example, when the transmitting member 30B moves away along the rotation center line Ct from the rotating parts 12 and 22 (or in the direction of D4 in FIG. 4), the distance increases from the contact point P1 to the rotation center of the drive shaft 11 and the distance increases between the contact point P4 to the rotation center of the driven shaft 21.

The maximum torque (Flim) that can be transmitted at the contact points P1 and P4 is expressed as follows:

$$Tlim = Ra1 \times Flim$$

where, Ra1 denotes the distance from the contact point P1 to the rotation center of the drive shaft 11. Since Flim is a constant, the maximum torque Tlim to be transmitted can be increased as the transmitting member 30B is moved so as to increase Ra1.

The rotation transmitting device 1B is provided with the actuator 35 that moves the transmitting member 30B. In the case of the rotation transmitting device 1B, the actuator 35 is constructed such that it moves the transmitting member 30B along the rotation center line Ct of the transmitting member 30B. The actuator 35 is attached to the bottom 32 of the transmitting member 30, for example. The position of the actuator 35 may be changed appropriately. The actuator 35 may be an electric motor, solenoid, plunger, shape memory alloy, or the like.

Incidentally, the rotation transmitting device 1B differs from the rotation transmitting device 1 in that the drive rotating part 12 has the outside-contact rotating part 12a whose external surface does not curve or bulge out in the radial direction of the rotation center line Ct of the transmitting member 30. In other words, the outside-contact rotating part 12a is formed such that a distance La from the rotation center line Ct to the external surface of the outside-contact rotating part 12a remains unchanged in the direction along the rotation center line Ct. This prevents change from occurring in the contact pressure and gap between the internal surface of the transmitting member 30B and the external surface of the drive rotating part 12 when the transmitting member 30B moves along the rotation center line Ct.

Moreover, the rotation transmitting device 1B differs from the rotation transmitting device 1 in that the outside-contact rotating part 22a of the driven rotating part 22 has its external surface uncurved. In other words, the outside-contact rotating part 22a is formed such that a distance Lb from the rotation center line Ct to the external surface of the outside-contact rotating part 22a does not change in the direction along the rotation center line Ct. This prevents change from occurring in the contact pressure and gap between the internal surface of the transmitting member 30B and the external surface of the driven rotating part 22 when the transmitting member 30B moves along the rotation center line Ct.

The ring unit 31 of the transmitting member 30B has its internal surface formed such that a bulge 31b projects toward the rotation center line Ct and extends in the circumferential direction of the transmitting member 30B. The ring unit 31 is in contact with the rotating parts 12 and 22 in the bulge 31b. This reduces the contact area between the ring unit 31 and the drive rotating part 12 and the contact area between the ring unit 31 and the driven rotating part 22.

Figure 5A:
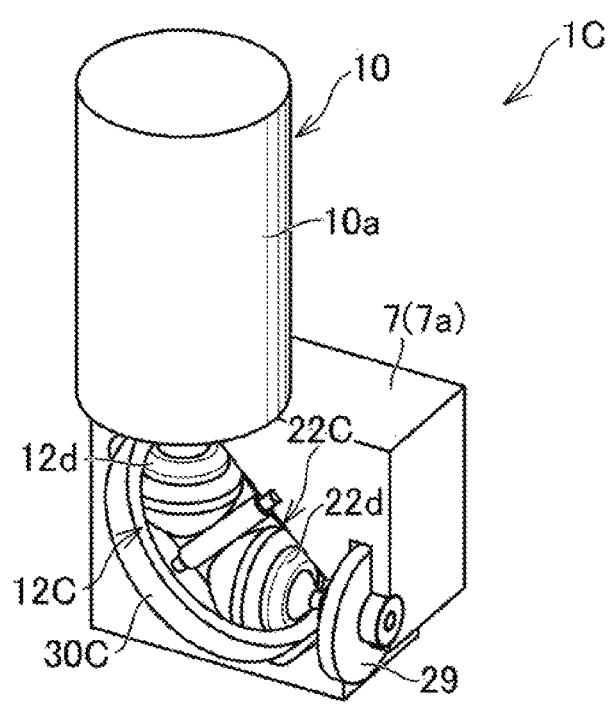
FIG. 5A is a perspective view depicting a further another example of the rotation transmitting device according to one embodiment of the present invention.
Figure 5B:
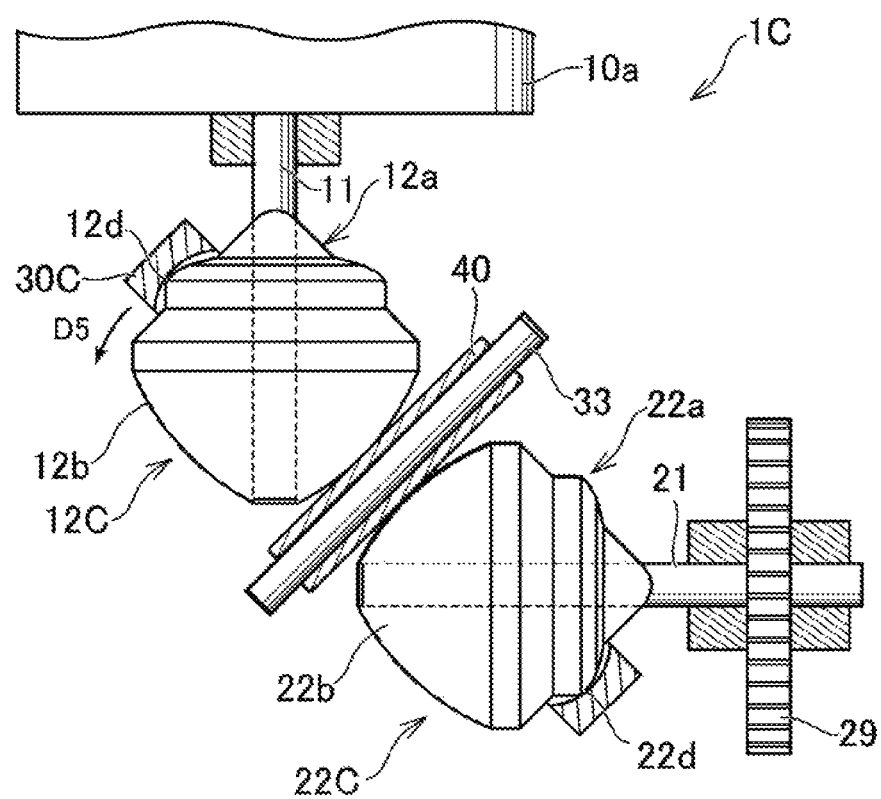
FIG. 5B is a sectional view depicting the important parts of the rotation transmitting device depicted in FIG. 5A.

The rotation transmitting device 1 mentioned above may be further modified as depicted in FIGS. 5A and 5B. FIG. 5A is a perspective view of a rotation transmitting device 1C, which depicts the inside of the casing 7, and FIG. 5B is a sectional view of the rotation transmitting device 1C. The original and modified devices employ the identical symbols to denote the identical parts, and the differences between them are mainly explained in the following, with description omitted for the identical parts throughout the two devices.

The rotation transmitting device 1C has the drive shaft 11 provided with a drive rotating part 12C and also has the driven shaft 21 provided with the driven rotating part 22C. In addition, the rotation transmitting device 1C has a transmitting member 30C. Unlike the transmitting member 30, the transmitting member 30C does not have the bottom 32 and hence takes on a ringlike shape as a whole.

The drive rotating part 12C has its outside-contact rotating part 12a so shaped as to form a bulge 12d on its external surface. The bulge 12d projects in the circumferential direction of the drive shaft 11. Likewise, the driven rotating part 22C has its outside-contact rotating part 22a so shaped as to form a bulge 22d on its external surface. The bulge 22d projects in the circumferential direction of the driven shaft 21. As depicted in FIG. 5B, the transmitting member 30C has its internal surface curved inwards in conformity with the bulges 12d and 22d. This prevents the transmitting member 30C from being displaced relative to the rotating parts 12C and 22C. For example, when the transmitting member 30C is given a force to displace it in a direction D5 as depicted in FIG. 5B, the bulge 12d, which engages with the internal surface of the transmitting member 30C, prevents the transmitting member 30C from being displaced. In the case where the transmitting member 30C is limited in its moving range (or rotating range), it is only necessary for the recess to be formed on that part of the internal surface of the transmitting member 30C which corresponds to the bulges 12d and 22d.

The recess to be formed on the internal surface of the transmitting member 30C should have an adequate depth so that the edge of the internal surface of the transmitting member 30C will not catch the bulges 12d and 22d to prevent the transmitting member 30C and the rotating parts 12C and 22C from smooth rotation.

The embodiments depicted in FIGS. 5A and 5B may be turned the other way round, such that the external surface of the rotating parts 12C and 22C has comparatively shallow recesses formed thereon and the internal surface of the transmitting member 30C has bulges formed thereon which fit the recesses on the rotating parts 12C and 22C. This structure also prevents the transmitting member 30C from being displaced relative to the rotating parts 12C and 22C.

The rotation transmitting device 1 mentioned above may be further modified as depicted in FIG. 6, which is a sectional view of a rotation transmitting device 1D. The original and modified devices employ the identical symbols to denote the identical parts, and the differences between them are mainly explained in the following, with description omitted for the identical parts throughout the two devices.

The reduction ratio ($\omega b/\omega a$) attained by the rotation transmitting device is defined by the following formula as mentioned above.

$$\omega b/\omega a = Ra1/Ra2 = Rb1/Rb2$$

The rotation transmitting device 1D has the driven rotating part 22D. The rotation transmitting device 1D is characterized in that the drive rotating part 12 and the driven rotating part 22 differ from each other in diameter. That is, the distance Ra1 and the distance Ra2 differ from each other, where Ra1 denotes the distance from the rotation center of the drive shaft 11 to the contact point P1 at which the internal surface of the transmitting member 30 meets the external surface of the drive rotating part 12, and Ra2 denotes the distance from the rotation center of the driven shaft 21 to the contact point P4 at which the internal surface of the transmitting member 30 meets the external surface of the driven rotating part 22. To be concrete, the distance Ra2 is larger than the distance Ra1. Likewise, the distance Rb1 and the distance Rb2 differ from each other, where Rb1 denotes the distance from the rotation center of the drive shaft 11 to the contact point P2 at which the intermediate transmitting member 40 meets the external surface of the drive rotating part 12, and Rb2 denotes the distance from the rotation center of the driven shaft 21 to the contact point P3 at which the intermediate transmitting member 40 meets the external surface of the driven rotating part 22. To be concrete, the distance Rb2 is larger than the distance Rb1. This permits the rotation of the drive shaft 11 to be transmitted to the driven shaft 21 at a reduced rate. Incidentally, the rotation transmitting device 1D is characterized in that the rotation center line Ct of the transmitting member 30B is aslant by 45 degrees toward both the drive shaft 11 and the driven shaft 21. The intermediate transmitting member 40 is supported by the supporting shaft 34 and is offset from the rotation center line Ct of the transmitting member 30.

Figure 7:
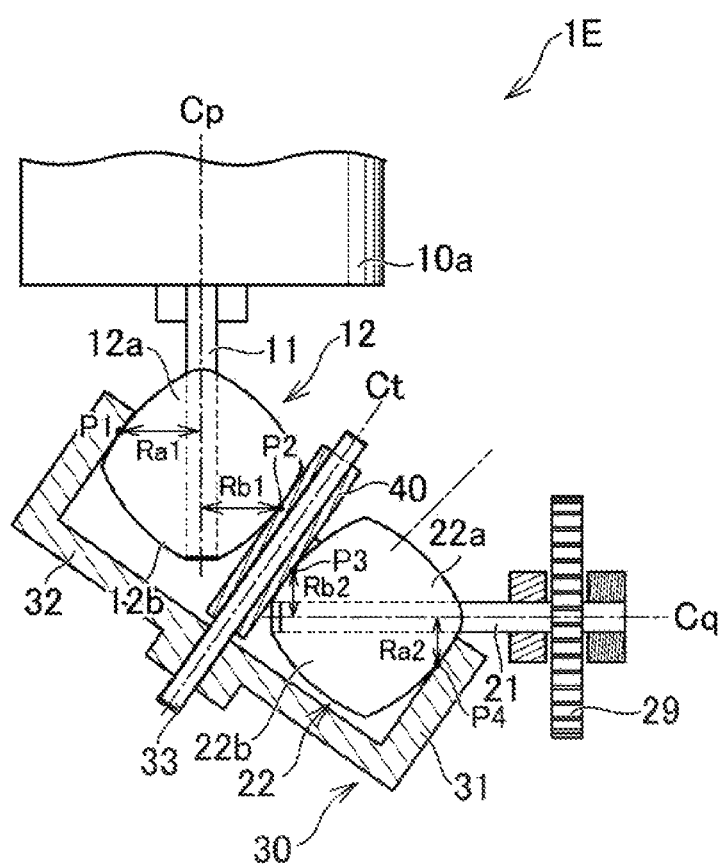
FIG. 7 is a sectional view depicting further another example of the rotation transmitting device according to one embodiment of the present invention.

The rotation transmitting device 1 mentioned above may be further modified as depicted in FIG. 7, which is a sectional view of a rotation transmitting device 1E. The original and modified devices employ the identical symbols to denote the identical parts, and the differences between them are mainly explained in the following, with description omitted for the identical parts throughout the two devices.

The rotation transmitting device 1E is identical with the rotation transmitting device 1 in that both the drive rotating part 12 and the driven rotating part 22 have the same diameter. However, the rotation center line Ct of the transmitting member 30 is set off from the straight line bisecting the angle between the drive shaft 11 and the driven shaft 21. In other words, both the angle between the rotation center line Ct and the drive shaft 11 and the angle between the rotation center line Ct and the driven shaft 22 are set off from 45 degrees. This is the reason why the distance Ra1 and the distance Ra2 differ from each other, where Ra1 denotes the distance from the rotation center of the drive shaft 11 to the contact point P1 at which the internal surface of the transmitting member 30 meets the external surface of the drive rotating part 12 and Ra2 denotes the distance from the rotation center of the driven shaft 21 to the contact point P4 at which the internal surface of the transmitting member 30 meets the external surface of the driven rotating part 22. In the case depicted in FIG. 7, the distance Ra2 is smaller than the distance Ra1. Likewise, the distance Rb1 and the distance Rb2 differ from each other, where Rb1 denotes the distance from the rotation center of the drive shaft 11 to the contact point at which the intermediate transmitting member 40 meets the external surface of the drive rotating part 12 and Rb2 denotes the distance from the rotation center of the driven shaft 21 to the contact point P4 at which the intermediate transmitting member 40 meets the external surface of the driven rotating part 22. In the case depicted in FIG. 7, the distance Rb2 is smaller than the distance Rb1. This permits the rotation of the drive shaft 11 to be transmitted to the driven shaft 21 at a reduced rate even though the drive rotating part 12 and the driven rotating part 22 are equal in diameter.

Figure 8A:
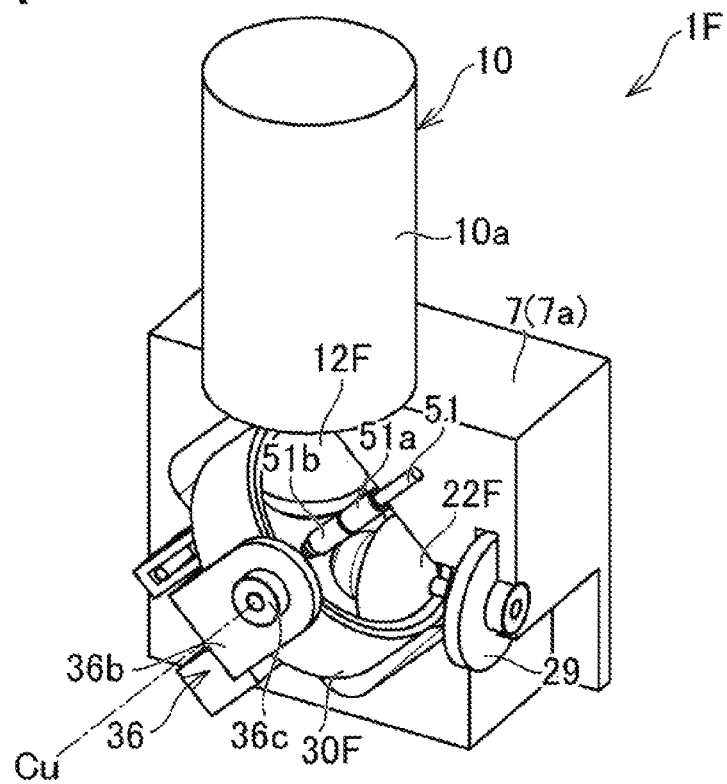
FIG. 8A is a perspective view depicting further another example of the rotation transmitting device according to one embodiment of the present invention.
Figure 8B:
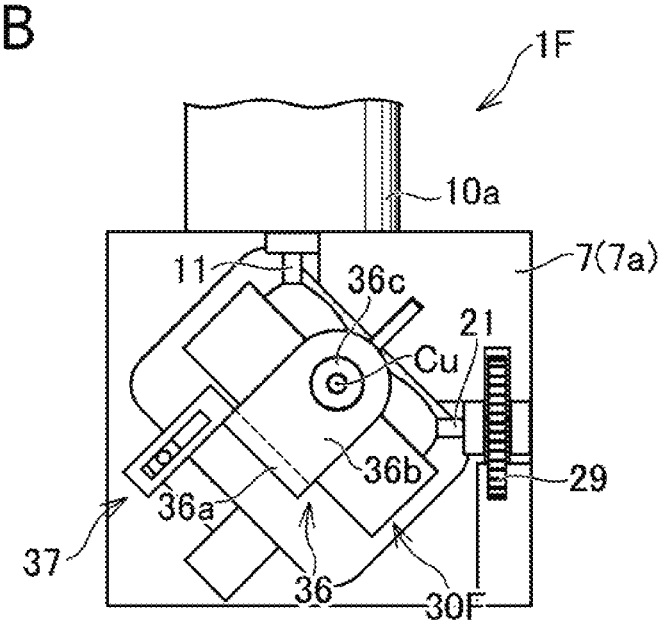
FIG. 8B is a side view depicting the important parts of the rotation transmitting device depicted in FIG. 8A.
Figure 8D:
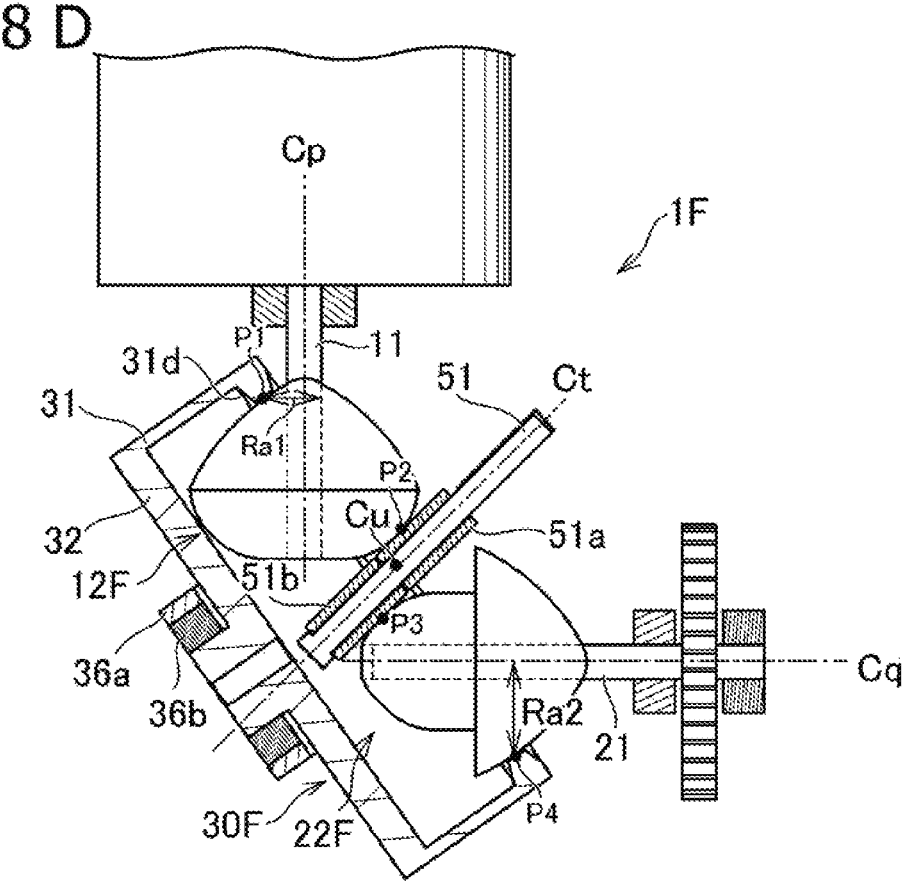
FIG. 8D is a sectional view depicting the important parts of the rotation transmitting device depicted in FIG. 8A. In this figure, the position of the transmitting member varies from the position depicted in FIG. 8C.

The rotation transmitting device 1 mentioned above may be further modified as depicted in FIGS. 8A to 8D. FIG. 8A is a perspective view of a rotation transmitting device 1F, which depicts the inside of the casing 7. FIG. 8B is a side view depicting the inside of the casing 7. FIGS. 8C and 8D are sectional views depicting the rotation transmitting device 1F. FIG. 8C and FIG. 8D differ from each other in the angle of a transmitting member 30F. In these figures, the original and modified devices employ the identical symbols to denote the identical parts, and the differences between them are mainly explained in the following, with description omitted for the identical parts throughout the two devices.

As depicted in FIG. 8A, the rotation transmitting device 1F has the transmitting member 30F. Also, the drive shaft 11 is provided with a drive rotating part 12F and the driven shaft 21 is provided with a driven rotating part 22F.

The rotation transmitting device 1F is characterized in that the transmitting member 30F is capable of oscillation around an axial line Cu (depicted in FIG. 8A) that intersects both the drive shaft 11 and the driven shaft 21. To be concrete, the axial line Cu intersects at right angles with both the drive shaft 11 and the driven shaft 21. As depicted in FIGS. 8C and 8D, the oscillation of the transmitting member 30F around the axial line Cu changes the distance Ra1 and the distance Ra2, where Ra1 denotes the distance from the rotation center of the drive shaft 11 to the contact point P1 at which the internal surface of the transmitting member 30 meets the external surface of the drive rotating part 12 and Ra2 denotes the distance from the rotation center of the driven shaft 21 to the contact point p4 at which the internal surface of the transmitting member 30 meets the external surface of the driven rotating part 22. As the result, the rotation transmitting device 1F can vary the reduction ratio. For example, in the case depicted in FIG. 8C, the transmitting member 30F has its rotation center line Ct inclined by 45 degrees with respect to both the drive shaft 11 and the driven shaft 21. The distance Ra1 and the distance Ra2 are equal to each other. In the case depicted in FIG. 8D, the transmitting member 30F varies in angle so that the distance Ra1 becomes smaller than the distance Ra2. Consequently, the rotation transmitting device 1F depicted in FIG. 8D transmits the rotation of the drive shaft 11 to the driven shaft 21 at a greater reduction ratio than that depicted in FIG. 8C.

As depicted in FIGS. 8A and 8B, the rotation transmitting device 1F has an oscillating member 36 which oscillatably supports the transmitting member 30F. In the case illustrated herein, the oscillating member 36 has a supporting member 36a attached to the bottom 32 of the transmitting member 30F (see FIG. 8C). The supporting member 36a has a bearing 36b, which permits the transmitting member 30F to rotate around the rotation center line Ct. As depicted in FIG. 8A, the oscillating member 36 has paired side members 36b which hold between them the transmitting member 30F. The side member 36b is provided with a supported member 36c which is supported by the casing 7 and which is capable of rotating around the axial line Cu. Thus, the oscillating member 36 permits the transmitting member 30F to rotate around the rotation center line Ct and to oscillate around the axial line Cu.

As depicted in FIG. 8B, the rotation transmitting device 1F has the actuator 37 that moves the oscillating member 36 around the axial line Cu. The actuator 37 may be an electric motor, solenoid, plunger, shape memory alloy, or the like. The actuator 37 is linked to the supporting part 36a of the oscillating member 36. The actuator 37 may have any other structure than this. For example, the side member 36b of the oscillating member 36 may have a gear that can rotate integrally with it so that the actuator 37 drives this gear.

As depicted in FIG. 8C, the outside-contact rotating part 12a of the drive rotating part 12F has its external surface curved in such a way that it describes an arc (in cross section) around the axial line Cu. The result is that when the transmitting member 30F changes in angle as depicted in FIG. 8D, it is possible to minimize change in the gap and contact pressure between the external surface of the outside-contact rotating part 12a and the internal surface of the transmitting member 30F. Likewise, the outside-contact rotating part 22a has its external surface (in cross section) curved such that the external surface describes an arc around the center of the axial line Cu.

The internal surface of the transmitting member 30F has the bulge 31d which is in contact with the rotating parts 12F and 22F. The bulge 31d helps reduce the contact area between the transmitting member 30F and the rotating parts 12F and 22F.

In addition, as depicted in FIGS. 8C and 8D, the rotation transmitting device 1F has the supporting shaft 51. The supporting shaft 51 is surrounded by cylindrical parts 51a and 51b fitted onto them and arranged in the axial direction of the supporting shaft 51. The cylindrical parts 51a and 51b are rotatable independently. The cylindrical part 51a is in contact with the drive rotating part 12 and the cylindrical part 51b is in contact with the driven rotating part 22. This structure prevents the supporting shaft 51 from interfering with the drive rotating part 12 and the driven rotating part 22 when the transmitting member 30F oscillates to change the reduction ratio.

Figure 9:
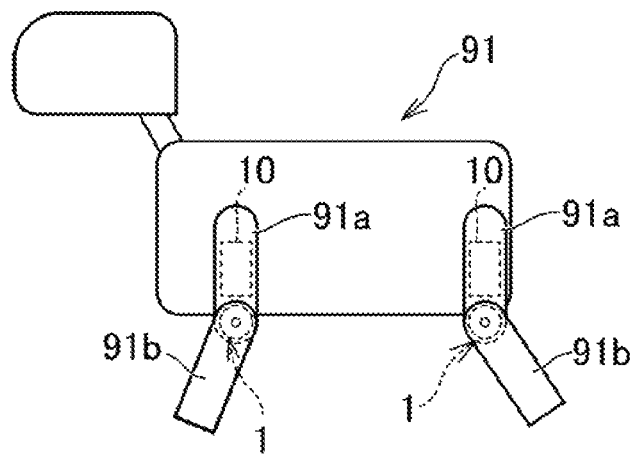
FIG. 9 is a diagram depicting an example of the robot provided with the rotation transmitting device according to one embodiment of the present invention.

FIG. 9 depicts an example of the robot to which is applied any one of the rotation transmitting devices 1 to 1F mentioned above. As depicted in FIG. 9, the robot 91 has a first arm 91a and a second arm 91b which constitute the leg. Any one of the rotation transmitting devices 1 to 1F is built into the first arm 91a. The second arm 91b is rotatable integrally with the driven shaft 21 mentioned above.

The present invention can be variously modified without being restricted to the embodiments mentioned above.

For example, the rotation transmitting device 1 mentioned above, which has one set of the intermediate transmitting member 40 between the drive rotating part 12 and the driven rotating part 22, may be so modified as to have, between the drive rotating part 12 and the driven rotating part 22, two sets of the intermediate transmitting member 40 which are apart from each other in the direction perpendicular to both the drive shaft 11 and the driven shaft 21. It is possible for both of the two sets of the intermediate transmitting member 40 to come into contact with the drive rotating part 12 and the driven rotating part 22.

It is not always necessary that the drive shaft 11 is the output shaft of the electric motor 10. For example, the drive shaft 11 may be driven by torque supplied through any other rotation transmitting mechanism.

In addition, the rotation transmitting device 1 may be provided with an encoder to detect the rotation of the driven shaft 21 or the rotation of the shaft (such as the shaft 92 depicted in FIG. 1C) which is linked to the driven shaft 21.

In addition, another possible arrangement is that the torque supplied to the transmitting member is distributed to the first and second rotating shafts which are arranged inside the transmitting member.

Moreover, either the drive rotating part 12 or the driven rotating part 22 may have a gear formed on its external surface. For example, the drive rotating part 12 may have a gear formed thereon. In this case, the transmitting member 30 may have the gear at the contact point at which the external surface of the drive rotating part 12 meets the transmitting member 30.

The invention claimed is:

1. A rotation transmitting device comprising:
   a first rotating shaft having a first rotating part having a first external surface;
   a second rotating shaft having a second rotating part having a second external surface, and the second rotating shaft being arranged in a direction intersecting with said first rotating shaft;
   a transmitting member having an internal cylindrical surface surrounding and engaging both said first external surface of the first rotating part and said second external surface of the second rotating part;
   an intermediate transmitting member having a cylindrically-shaped external surface, and being arranged such that the cylindrically-shaped external surface is in rotatable communication with both the first external surface of the first rotating part and the second external surface of the second rotating part, wherein
   said first rotating part transmits rotation to said transmitting member and to said intermediate transmitting member,
   said second rotating part receives rotation from said transmitting member and from said intermediate transmitting member, and
   the rotation is transmitted between said first rotating part and said second rotating part by way of:
   friction between the internal cylindrical surface of the transmitting member and the first external surface of the first rotating part and the second external surface of the second rotating part, and
   friction between the cylindrically-shaped external surface of the intermediate transmitting member and the first external surface of the first rotating part and the second external surface of the second rotating part.

2. The rotation transmitting device as defined in claim 1, wherein said first external surface and said second external surface are in contact with the internal cylindrical surface are in contact through an oil film which is formed between them.

3. The rotation transmitting device as defined in claim 1, wherein said transmitting member is capable of rotation around a rotation center line which inclines toward both said first rotating shaft and said second rotating shaft.

4. The rotation transmitting device as defined in claim 1, wherein said transmitting member has its internal surface so formed as to give a bulge which comes into contact with the external surface of said at least either said first rotating part or said second rotating part and extends along the circumference of said transmitting member.

5. The rotation transmitting device as defined in claim 1, wherein said first external surface of said first rotating part and/or said second external surface of said second rotating part is so formed as to give a bulge which comes into contact with the internal cylindrical surface of said transmitting member and extends along the circumference of said first rotating part and/or said second rotating part.

6. The rotation transmitting device as defined in claim 1, wherein a distance is adjustable from a rotation center of said first rotating part and/or said second rotating part to a contact point between said first rotating part and/or said second rotating part and said transmitting member.

7. The rotation transmitting device as defined in claim 6, wherein
   said transmitting member rotates around a rotation center line which inclines toward both said first rotating shaft and said second rotating shaft, and
   said transmitting member is movable along the rotation center line of said transmitting member.

8. The rotation transmitting device as defined in claim 6, wherein said transmitting member is capable of oscillation around the axial line intersecting with both said first rotating shaft and said second rotating shaft.

* * * * *